US009739607B2

(12) United States Patent
Michiwaki

(10) Patent No.: US 9,739,607 B2
(45) Date of Patent: Aug. 22, 2017

(54) CROSS-SECTIONAL PROFILE MEASURING METHOD

(75) Inventor: Hirokazu Michiwaki, Kawasaki (JP)

(73) Assignee: MITUTOYO CORPORATION, Kawasaki-Shi (JP)

(*) Notice: Subject to any disclaimer, the term of this patent is extended or adjusted under 35 U.S.C. 154(b) by 758 days.

(21) Appl. No.: 13/480,878

(22) Filed: May 25, 2012

(65) Prior Publication Data

US 2012/0303320 A1 Nov. 29, 2012

(30) Foreign Application Priority Data

May 27, 2011 (JP) ................................. 2011-119445

(51) Int. Cl.
*G01B 21/04* (2006.01)
(52) U.S. Cl.
CPC ................................. *G01B 21/047* (2013.01)
(58) Field of Classification Search
CPC ........ G01Q 10/00; G01Q 10/02; G01Q 10/04; G06F 15/00
USPC ......................................... 702/168; 850/2–5
See application file for complete search history.

(56) References Cited

U.S. PATENT DOCUMENTS

| | | | |
|---|---|---|---|
| 2005/0132591 A1 | 6/2005 | Kojima et al. | |
| 2008/0021672 A1 | 1/2008 | Powley et al. | |
| 2008/0083127 A1 | 4/2008 | McMurtry et al. | |
| 2008/0189969 A1* | 8/2008 | Fuchs et al. | .................... 33/503 |
| 2009/0030648 A1* | 1/2009 | Hunter | ................... G01B 21/04 |
| | | | 702/152 |
| 2009/0299692 A1 | 12/2009 | Yoshizumi et al. | |
| 2009/0307916 A1* | 12/2009 | McLean et al. | ................ 33/503 |
| 2010/0050837 A1 | 3/2010 | Ould et al. | |
| 2013/0041624 A1* | 2/2013 | Li | ................................. 702/168 |

FOREIGN PATENT DOCUMENTS

| | | |
|---|---|---|
| CN | 85106993 | 4/1987 |
| CN | 1621778 | 6/2005 |
| CN | 1637380 | 7/2005 |
| CN | 101166950 | 4/2008 |
| JP | 2008-539431 | 11/2008 |

(Continued)

OTHER PUBLICATIONS

European Search Report dated Aug. 26, 2013, EP Application No. 12169307.1, six pages.

(Continued)

*Primary Examiner* — Ricky Ngon
(74) *Attorney, Agent, or Firm* — Rankin, Hill & Clark LLP

(57) ABSTRACT

A cross-sectional profile measuring method of measuring cross-sectional profiles of an object at plural measurement sections of the object with a contact probe, includes: circularly moving the probe along a route around a circumference of the object at one of the measurement sections, a distance of the moving being longer than a measurement range corresponding to the circumference of the object by a predetermined overlapping range consisting of an acceleration range and a deceleration range; and moving the probe to next one of the measurement sections through a transfer range in a movement direction oblique to a continuous direction in which the cross-sectional profiles are adjacent to one another to offset a distance corresponding to the overlapping range.

6 Claims, 4 Drawing Sheets

(56) References Cited

FOREIGN PATENT DOCUMENTS

| JP | 2009-501321 | 1/2009 |
|----|-------------|--------|
| JP | 2009-531695 | 9/2009 |
| JP | 2009-293992 | 12/2009 |

OTHER PUBLICATIONS

European Opposition with English Translation dated Jul. 14, 2015, 43 pages.
"Carl Zeiss Scanning Technology" Video, published on YouTube; https;//www.youtube.com/watch?v=XqtVzAqWHFw Jun. 29, 2009, in particular scene from 4:59 minutes, screen printout, 2 pages.
Weckenmann, Gawande, "Coordinate Measurement Technology" Textbook, ISBN 3-446-17991-7, Carl Hanser Verlag, 1999, 6 pages.
Gerlach, "Detection Strategy for Determining the Degree of Pairing on Cylindrical Surfaces for Mechanical Sensing", Thesis, Technical University of Chemnitz, Jul. 29, 2008, 146 pages.
Extract from the catalogue of the library of the Technical University of Chemnitz, Jul. 29 2008, 1 page.
Affidavit of Mr. John Lewis, Marketing Manager of Carl Zeiss Industrial Metrology LLC, 4 pages, Apr. 2009.
Chinese Office Action with English Translation, dated Oct. 10, 2015, 8 pages.

* cited by examiner

CROSS-SECTIONAL PROFILE MEASURING METHOD

The entire disclosure of Japanese Patent Applications No. 2011-119445 filed May 27, 2011 is expressly incorporated by reference herein.

BACKGROUND OF THE INVENTION

1. Field of the Invention

The present invention relates to a cross-sectional profile measuring method.

2. Description of Related Art

In order to measure a profile of an object, a coordinate measuring machine has been typically used. A contact probe of the coordinate measuring machine is brought into contact with a surface of the object for scanning to obtain measuring data of the profile of the object.

For instance, Patent Literature 1 (JP-T-2009-531695) discloses that a five-axis control coordinate measuring machine with a probe whose stylus posture can be adjustable arbitrarily is used for measuring a cross-sectional profile of a turbine blade. Surface profile data is obtained by moving the stylus along a surface of the object in a serpentine manner or continuous cross-sectional profile data is obtained by circularly moving the stylus along the circumference of the object.

A plurality of cross-sectional profiles need to be measured for many objects. For instance, for an object such as a turbine blade having blade profiles gradually changing in the longitudinal direction thereof, it is necessary to accurately measure cross-sectional profiles at plural sections shifted in the longitudinal direction at predetermined intervals.

In this case, generally, one part program, which is composed for circularly moving the stylus around an object for measuring the cross-sectional profile and provided for each section to be measured, is executed at the corresponding section. Each time when the section to be measured is changed, the stylus is necessarily brought into contact, moved for measurement, removed from the object, and moved to a different section. The probe has to be accelerated or decelerated for each of the above actions, so that operating efficiency is lowered.

In contrast, according to Patent Literature 2 (JP-A-2009-293992), in order to continuously measure cross-sectional profiles of an object at plural sections, after being brought into contact with the object for cross-sectional profile measurement at a predetermined section, the stylus is moved to the next section while being in contact with the object, and then performs the cross-sectional profile measurement at that section. When a series of cross-sectional profile measurement is completed by repeating the above process, the stylus is removed from the object.

In Patent Literature 2, measurement-start points (measurement-end points) are simply shifted from one another in the longitudinal direction of the object. Additionally, the operation of the probe for measurement, i.e., the circular movement of the stylus around the object, is the same irrespective of the measurement sections.

In order to measure a cylindrical object, the stylus is not circularly moved around the object at each of plural sections but may be moved along a spiral locus for measuring the surface profile of the object. When the stylus is moved along the spiral locus, the probe can continuously perform the measuring operation, so that a measurement state can be uniformed during the measuring operation (e.g., the stylus can be moved at a constant speed). Patent Literature 3 (JP-T-2009-501321) discloses such a spiral profile measurement. Additionally, in order to stabilize the measurement data, a pre-scanning path (an acceleration range) and a post-scanning path (a deceleration range) are provided before and after the measuring operation so that the measuring operation can be stably performed during the spiral movement of the stylus through a range between the pre-scanning path and the post-scanning path.

Although the technique of providing the acceleration range and the deceleration range as disclosed in Patent Literature 3 is effective in stabilization of measurement data, this technique cannot be simply combined with the continuous measurement for measuring plural cross-sectional profiles as disclosed in Patent Literature 2.

In other words, in the cross-sectional profile measurement as disclosed in Patent Literature 2, although the stylus is kept in contact with the surface of the object for continuous measurement, the measurement section has to be changed after the measuring operation of the probe (i.e., the circular movement of the stylus around the object). In view of the above, it is not effective to accelerate and decelerate the probe before and after a series of measuring operation.

According to Patent Literature 3, although the profile can be stably measured by accelerating and decelerating the probe before and after the measuring operation, the stylus has to be moved along the spiral locus and thus it is not possible to directly measure plural cross-sectional profiles. As a result, a complicated calculation or the like is necessary to obtain the plural cross-sectional profiles.

SUMMARY OF THE INVENTION

An object of the invention is to provide a cross-sectional profile measuring method capable of a stable measurement to directly obtain plural cross-sectional profiles.

According to an aspect of the invention, a cross-sectional profile measuring method of measuring cross-sectional profiles of an object at plural measurement sections of the object with a contact probe, includes: circularly moving the probe along a route around a circumference of the object at one of the measurement sections, a distance of the moving being longer than the circumference of the object by a predetermined overlapping range; and moving the probe to next one of the measurement sections in a movement direction oblique to a direction in which the cross-sectional profiles are adjacent to one another to offset a distance corresponding to the overlapping range.

With the above aspect, plural cross-sectional profiles can be directly measured by circularly moving the probe around the object at each measurement section. Additionally, the probe can be accelerated and decelerated in the overlapping range, so that the measurement can be stably performed before and after the acceleration and the deceleration.

Further, since the distance of the circular movement of the probe around the object is longer than the circumference of the object by the predetermined overlapping range, the measuring operation can be performed over a range equivalent to the circumference of the object.

Since the movement direction of the probe is oblique to the direction in which the cross-sectional profiles are adjacent to one another, the distance corresponding to the overlapping range is offset (i.e., the probe is moved back by an extra distance corresponding to the overlapping range). Thus, it is possible to align the respective measurement-start points (measurement-end points) at the measurement sections with one another.

In the above aspect, it is preferable that the overlapping range includes an acceleration range for accelerating the probe and a deceleration range for decelerating the probe and that a measurement range is defined between the acceleration range and the deceleration range, the measurement range being equivalent to the circumference of the object.

With the above arrangement, the probe can be accelerated and decelerated before and after the measuring operation in the measurement range, so that the probe can stably perform the measuring operation over the measurement range equivalent to the circumference of the object.

In the above aspect, it is preferable that the method further includes: detecting a measurement-start point and a measurement-end point from measurement data for the cross-sectional profiles; obtaining a midpoint between the measurement-start point and the measurement-end point; and correcting each of the measurement-start point and the measurement-end point to the midpoint.

With the above arrangement, even when the measurement-start point and the measurement-end point do not coincide with each other, the measurement-start point and the measurement-end point can be matched. Simultaneously, it is preferable that data for an area adjacent to the measurement-start point and the measurement-end point is adjusted in accordance with the correction of the measurement-start point and the measurement-end point to smoothen measurement data. Such an adjacent area may be appropriately defined in accordance with a misalignment between the measurement-start point and the measurement-end point. Specifically, the area may be elongated when the misalignment is large and may be shortened when the misalignment is small.

DETAILED DESCRIPTION OF PREFERRED EMBODIMENT

Exemplary embodiment(s) of the invention will be described below with reference to the attached drawings.

Instrument Arrangement

Figure 1:
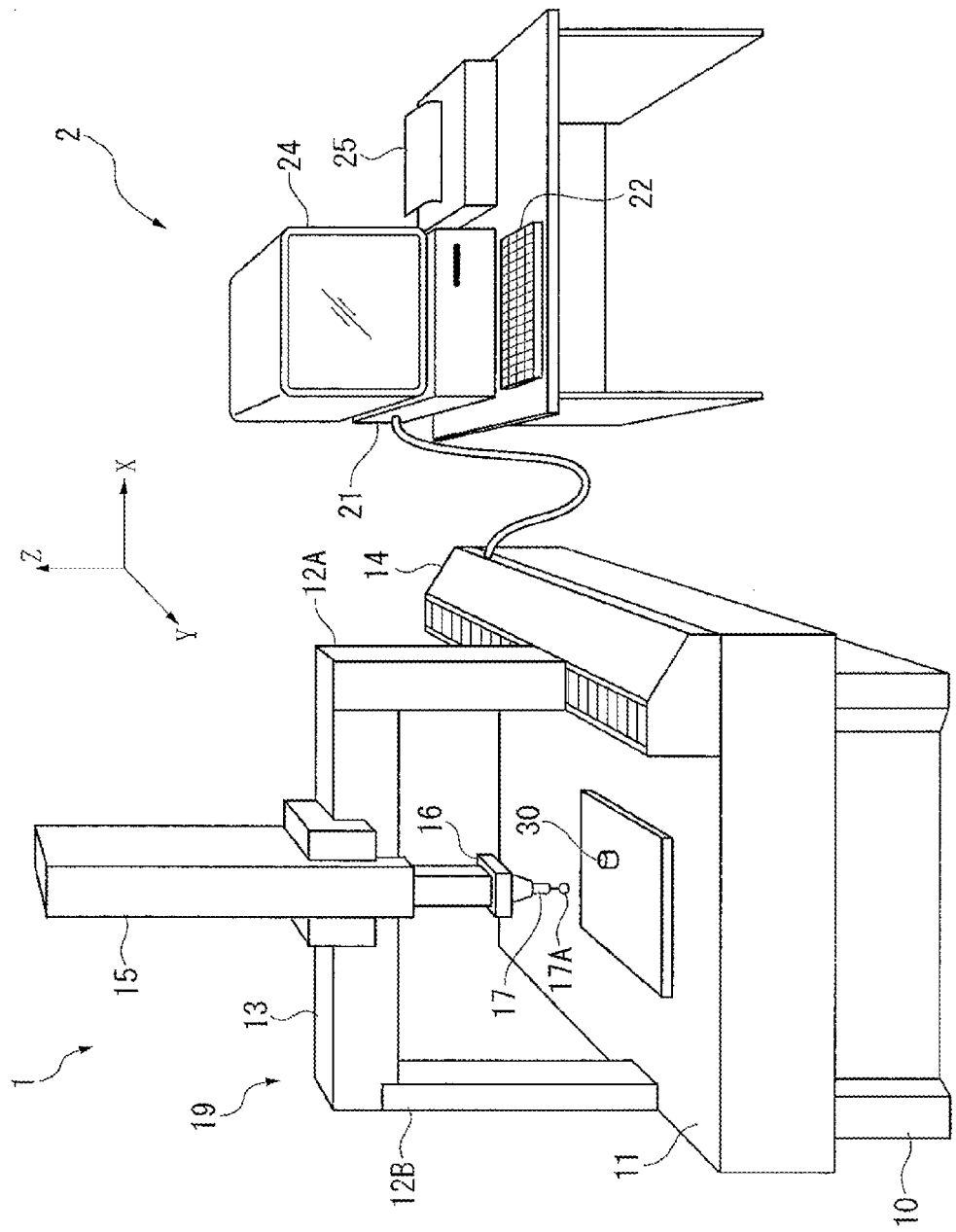
FIG. 1 is a perspective view showing an instrument arrangement according to an exemplary embodiment of the invention.

As shown in FIG. 1, a profile measuring instrument according to an exemplary embodiment includes a five-axis control coordinate measuring machine 1 and a computer 2. In the coordinate measuring machine 1, a contact probe 17 is supported and has a stylus whose three-dimensional position and orientation are adjustable as desired. The computer 2 controls the driving of the coordinate measuring machine 1 to obtain measurement data of each contact position and executes a process of measuring cross-sectional profiles of a workpiece 30 (an object) at plural sections.

The coordinate measuring machine 1 includes: a surface plate 11 that has a horizontal upper surface and is supported on a vibration isolation table 10; and a movement mechanism 19 that is disposed on the surface plate 11 to support and three-dimensionally move the contact probe 17.

The movement mechanism 19 includes: beam supports 12A and 12B standing upright on both sides of the surface plate 11; and a beam 13 that is supported on the respective upper ends of the beam supports 12A and 12B and extends in an X-axis direction. The lower end of beam support 12A is driven in a Y-axis direction by a Y-axis driving mechanism 14. The lower end of the beam support 12B is supported on the surface plate 11 by an air bearing and is movable in the Y-axis direction. The beam 13 supports a column 15 extending in a vertical direction (a Z-axis direction). The column 15 is driven in the X-axis direction along the beam 13. The column 15 supports a holder 16, which is driven in the Z-axis direction along the column 15. The driving mechanism of each axis has a function of detecting a position and a movement amount along the axis.

The probe 17 is attached to the lower end of the holder 16. The tip end of the probe 17 is provided with a stylus, which includes, for instance, a spherical contact point, namely a tip ball 17A. The probe 17 has a function of tilting the stylus including the tip ball 17A relative to a portion attached to the holder 16 and a function of rotating the stylus around a center axis of the portion attached to the holder 16.

In addition to the above tilting function and rotating function, the probe 17 is five-axially controllable based on the three-dimensional movement of the movement mechanism 19, so that the tip ball 17A can be brought from any direction into contact with any position on a surface of the workpiece 30 set on the surface plate 11.

The computer 2 includes a computer body 21, an operating keyboard 22, a display 24 and a printer 25.

The computer body 21, which is provided with a processing unit, a storage and the like (not shown), is connected to the probe 17 via an interface (not shown).

The computer 2, which is activated by external operation, executes a stored program, thereby controlling the operation of the coordinate measuring machine 1 and processing a signal from the probe 17 to output a designated measurement result.

Measurement Process

In the exemplary embodiment, a measurement program is executed by the computer 2 and an operation signal is sent from the computer 2 to the coordinate measuring machine 1 so that the coordinate measuring machine 1 performs a predetermined measuring operation.

Specifically, the probe 17 is three-dimensionally moved relative to the surface plate 11 by the movement mechanism 19 while the orientation of the probe 17 is adjusted, thereby bringing the tip ball 17A into contact with the circumferential surface of the workpiece 30 to scan the surface profile thereof. In this manner, the cross-sectional profiles of the workpiece 30 at plural sections are continuously measured.

Figure 2:
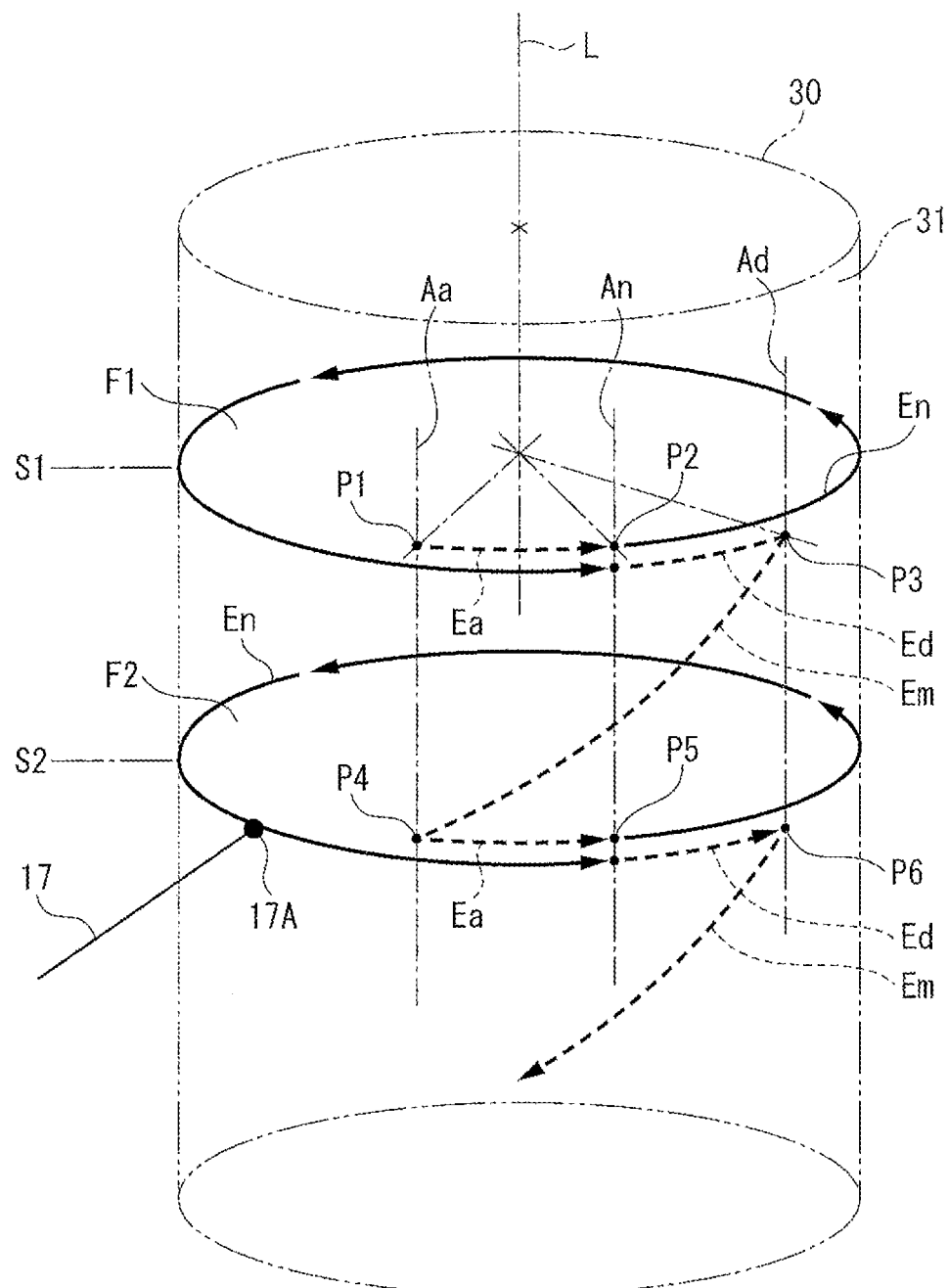
FIG. 2 schematically shows a measuring operation according to the exemplary embodiment.

As shown in FIG. 2, the workpiece 30 (an object) is, for instance, in a cylindrical shape and a continuous direction thereof (a center-axial direction of the cylindrical shape) is defined as a continuous direction L.

In the exemplary embodiment, plural measurement sections S1, S2, . . . are defined in the continuous direction L of the workpiece 30 at predetermined intervals and measurement is performed at each of plural measurement sections S1, S2, . . . to obtain cross-sectional profiles F1, F2, . . . of the workpiece 30.

Specifically, in the exemplary embodiment, during the movement of the probe 17, the tip ball 17A is continuously in contact with the workpiece 30 at the measurement section S1 for scanning around the circumference of the workpiece 30, and is moved to the next measurement section (the measurement section S2, . . . ), at which the same scanning is repeated around the circumference of the workpiece 30.

Such a measuring operation including the movement of the probe 17 is performed as follows according to the exemplary embodiment.

Prior to the measuring operation, positions related to the actions of the probe 17, i.e., an acceleration position Aa, a start position An and a deceleration position Ad, are defined on a circumferential surface 31 of the workpiece 30.

Based on these positions Aa, An and Ad, the actions of the probe 17 (i.e., contacting, accelerating, measuring, decelerating, and moving to the next section) at each of the measurement sections S1, S2, . . . are controlled. Specifically, an acceleration range Ea is defined between the acceleration position Aa and the start position An and a deceleration range Ed is defined between the start position An and the deceleration position Ad.

A range starting from the start position An and continuing around the workpiece 30 (corresponding to the circumference of the workpiece 30) is defined as a measurement range En. A range between the deceleration position Ad at the previous measurement section (e.g., the measurement section S1) and the acceleration position Aa at the next measurement section (e.g., the measurement section S2) is defined as a transfer range Em for the probe 17 to be transferred to the next measurement section.

When a section defined in the continuous direction L (one of the measurement sections S1, S2, . . . ) is specified, the acceleration position Aa, the start position An and the deceleration position Ad, which are defined as angular positions around, for instance, the continuous direction L of the workpiece 30, may be determined as specific points on the circumferential surface 31 (i.e., positions on the outline of one of the cross-sectional profiles F1, F2, . . . ).

After the acceleration position Aa, the start position An and the deceleration position Ad are determined, the probe 17 is moved for measurement.

In order to measure the cross-sectional profile F1 at the first measurement section S1, the probe 17 is moved to a point P1 (the acceleration position Aa of the measurement section S1) and the tip ball 17A is brought into contact with the circumferential surface 31 at the point P1 (an allocating step).

Subsequently, while the tip ball 17A is kept in contact with the circumferential surface 31, the probe 17 is moved along the acceleration range Ea in an accelerated manner such that a predetermined measurement speed is reached at a point P2 (the start position An) (an accelerating step). The probe 17 passes through the point P2 instead of stopping.

After the probe 17 passes through the point P2, the probe 17 is continuously moved around the workpiece 30 while maintaining the above measurement speed, thereby sliding the tip ball 17A on the circumferential surface 31 over the measurement range En (corresponding to the circumference of the workpiece 30) (a measuring step). The displacement of the tip ball 17A is recorded.

After passing through the measurement range En, the probe 17 returns to the point P2 (the start position An). The probe 17 passes through the point P2 instead of stopping and is continuously moved along the deceleration range Ed in a decelerating manner to stop at a point P3 (the deceleration position Ad) (a decelerating step).

In order to start measurement at the next measurement section (the second measurement section S2), while the tip ball 17A is kept in contact with the circumferential surface 31, the probe 17 is obliquely moved along the circumferential surface 31 (in an inclined manner relative to the continuous direction L) (a transferring step).

The probe 17 is then moved to a point P4 (the acceleration position Aa) at the measurement section S2 in the same manner as at the first measurement section S1 (the allocating step).

Subsequently, the accelerating step (accelerating to a point P5), the measuring step (returning to the point P5 after the circular movement), the decelerating step (stopping at a point P6) are performed in the same manner as at the first measurement section S1, thereby measuring the cross-sectional profile F2 at the second measurement section S2.

The same steps are repeated at each of the following measurement sections to measure the cross-sectional profiles F1, F2, . . . at the plural measurement sections S1, S2, . . . .

The displacement of the probe 17 is continuously recorded in the computer 2. Specifically, the displacement of the tip ball 17A is continuously recorded throughout a period from when the tip ball 17A is brought into contact with the circumferential surface 31 at the acceleration position Aa of the first measurement section S1 to when the tip ball 17A is removed from the circumferential surface 31 at the last measurement section.

From thus obtained original data, data regarding one circular movement around the workpiece 30 at each of the measurement sections S1, S2, . . . (i.e., data regarding the measurement along the measurement range En during the measuring step) is extracted. The cross-sectional profiles (F1, F2, . . . ) can be obtained from such extracted data. In other words, in order to obtain the cross-sectional profile F1 at the measurement section S1, data obtained throughout a period from when the probe 17 passes through the point P2 for the first time (a measurement-start point) to when the probe 17 returns to the point P2 after being circularly moved around the workpiece 30 (a measurement-end point) is extracted. Likewise, in order to obtain the cross-sectional profiles F2, . . . at the other measurement sections S2, . . . , data is extracted in the same manner as described above.

In the exemplary embodiment, the measurement-start point and the measurement-end point are corrected so that the measurement data for the cross-sectional profiles F1, F2, . . . is provided in a closed loop.

Figure 3:
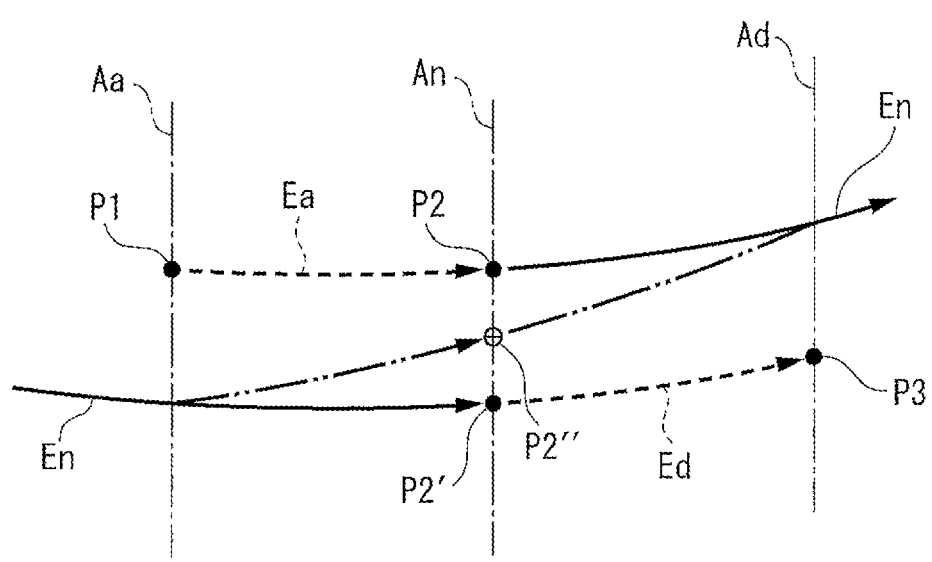
FIG. 3 schematically shows correction of measurement-start point and measurement-end point according to the exemplary embodiment.

As shown in FIG. 3, after being circularly moved around the workpiece 30, the probe 17 is intended to pass through the point P2 again but may pass through a point P2', which is slightly misaligned from the point P2, due to the positioning accuracy of the coordinate measuring machine 1. In this case, since the measurement-start point is the point P2 but the measurement-end point is the point P2', outline data for the cross-sectional profile F1 is not in a closed loop.

Accordingly, in the exemplary embodiment, during the data processing of the computer 2, the originally passed point P2 and the repassed point P2' are imaginarily connected to each other via a straight line and the actual start point and end point of the outline data for the cross-sectional profile F1 are replaced by the midpoint of the straight line, i.e., a point P2". Further, the outline data for the cross-sectional profile F1 is partially adjusted (partial data regarding, for instance, areas corresponding to the acceleration range Ea and the deceleration range Ed is adjusted) so that these sections can smoothly continue to the point 2P''' (the replaced start point or end point).

By the above correction of the measurement-start point and the measurement-end point, the cross-sectional profiles F1, F2 . . . can be obtained from closed-loop measurement data.

The exemplary embodiment provides the following advantages.

By the circular measurement around the workpiece 30 at each of the measurement sections S1, S2, . . . , the plural cross-sectional profiles F1, F2, . . . can be directly obtained. Further, an overlapping range, i.e., the acceleration range Ea and the deceleration range Ed, can be used to accelerate and decelerate the probe 17, thereby stably performing the measurement in the measurement range En without acceleration or deceleration of the probe 17.

At each of the measurement sections S1, S2, . . . , the distance of the circular movement of the probe 17 around the workpiece 30 is longer than the circumference of the workpiece 30 by the predetermined overlapping range (the sum of the acceleration range Ea and the deceleration range Ed), so that the measurement range En can be made equivalent to the circumference of the workpiece 30.

In the transfer range Em, the movement direction of the probe 17 is oblique to the continuous direction L of the workpiece 30 (a direction in which the cross-sectional profiles F1, F2, . . . are adjacent to one another), so that a distance corresponding to the overlapping range can be offset (i.e., the probe 17 is moved back by an extra distance corresponding to the overlapping range). Thus, the respective measurement-start points (measurement-end points) at the measurement sections S1, S2, . . . can be aligned with the start position An.

Even when the measurement range En starts at the point P2 but ends at the point P2' (i.e., the measurement-start point and the measurement-end point do not coincide with each other), the measurement-start point and the measurement-end point are corrected to the point P2", so that the measurement data for the cross-sectional profiles F1, F2, . . . at the measurement sections S1, S2, . . . can be provide in a closed-loop.

It should be appreciated that the scope of the invention is not limited to the above exemplary embodiment but modifications and improvements are included within the scope of the invention as long as an object of the invention is achieved Although the measurement-start point (the point P2) and the measurement-end point (the point P2') are corrected to the midpoint therebetween (the point P2") in the exemplary embodiment, either one of the measurement-start point (the point P2) and the measurement-end point (the point P2') may be corrected to be coincident with each other.

In the exemplary embodiment, when the measurement-start point and the measurement-end point are corrected, data relating to the adjacent area is also corrected to smoothly change. The adjacent area subjected to the correction may correspond to the acceleration range Ea and the deceleration range Ed as in the exemplary embodiment or, alternatively, another range may be provided for the correction. For instance, the adjacent area subjected to the correction may be extended when the measurement-start point (the point P2) and the measurement-end point (the point P2') are largely misaligned from each other, while the adjacent area may be shortened when they are not so largely misaligned.

Alternatively, in place of correcting the adjacent area, an average value between outline data based on the point P2 and outline data based on the point P2' may be obtained as outline data based on the point P2". In this manner, although the outline data is not so smooth as that obtained by the correction of the adjacent area, the calculation can be further simplified.

Although the acceleration range Ea is substantially equal in length to the deceleration range Ed in the exemplary embodiment, they may be mutually different in length. In other words, the respective lengths of the acceleration range Ea and the deceleration range Ed may be appropriately determined in implementing the invention.

In the exemplary embodiment, when reaching the deceleration position Ad in the deceleration range Ed, the probe 17 temporarily stops before entering the transfer range Em. However, the probe 17 may enter the transfer range Em along a gentle arc locus instead of stopping at the deceleration position Ad.

Likewise, the probe 17 may enter the acceleration range Ea from the transfer range Em along a gentle arc locus instead of temporarily stopping.

Figure 4:
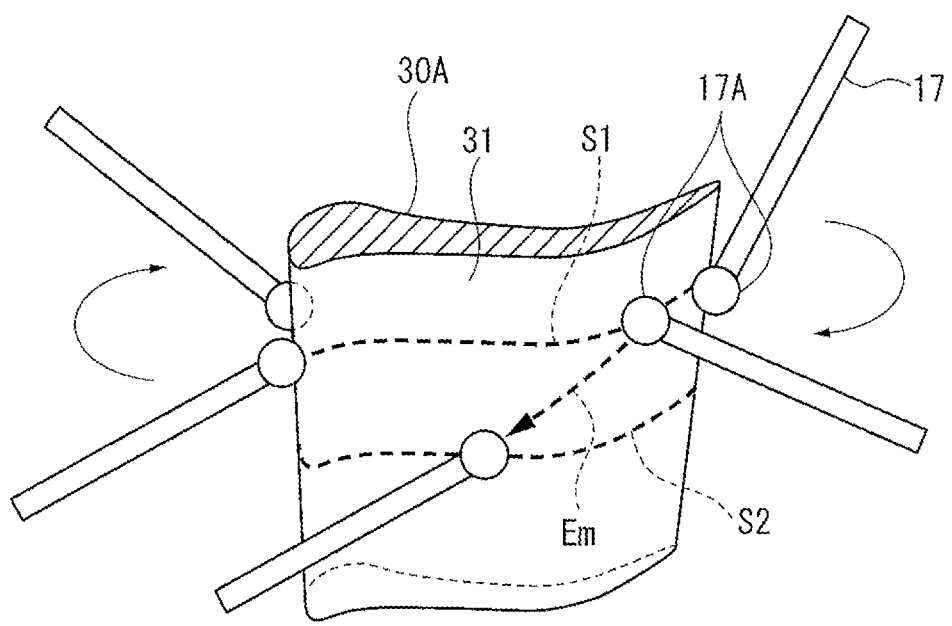
FIG. 4 schematically shows measurement of a turbine blade according to the exemplary embodiment.

Although the cylindrical workpiece 30 is used as an object in the exemplary embodiment, the shape of the object is not particularly limited. In other words, the invention is favorably applicable to, for instance, a turbine blade 30A as shown in FIG. 4. In addition to the turbine blade 30A, the invention is also applicable to other blades, elongated articles and the like. Further, in addition to the elongated objects, the invention is applicable to any object like a block or a lump.

What is claimed is:

1. A cross-sectional profile measuring method of measuring cross-sectional profiles of an object at plural measurement sections of the object with a contact probe, the method comprising:
   circularly moving the probe by passing through a first start position of a first measurement section along a route around a circumference of the object to return to the first start position, a distance of the moving being longer than the circumference of the object by a predetermined overlapping range and measuring a first cross-sectional profile of the first measurement section;
   circularly moving the probe by passing through a second start position of a second measurement section along a route around a circumference of the object to return to the second start position, a distance of the moving being longer than the circumference of the object by the overlapping range and measuring a second cross-sectional profile of the second measurement section; and
   when the probe is shifted from the first measurement section to the second measurement section, moving the probe to the second measurement section in a movement direction opposite to the moving direction of the probe at the first measurement section, as viewed in the first cross-sectional profile, and oblique to a direction in which the first and second cross-sectional profiles are adjacent to one another to offset a distance corresponding to the overlapping range.

2. A cross-sectional profile measuring method of measuring cross-sectional profiles of an object at plural measurement sections of the object with a contact probe, the method comprising:
   circularly moving the probe from a first measurement-start point of a first measurement section along a route around a circumference of the object to a first measurement-end point, correcting the first measurement-start point and the first measurement-end point so that a first cross-sectional profile of the first measurement section is provided in a closed loop, and measuring the first cross-sectional profile;
   circularly moving the probe from a second measurement-start point of a second measurement section along a route around a circumference of the object to a second measurement-end point, correcting the second measurement-start point and the second measurement-end point so that a second cross-sectional profile of the second measurement section is provided in a closed loop, and measuring the second cross-sectional profile; and when the probe is shifted from the first measurement section to the second measurement section, moving the probe to the second measurement section in a movement direction opposite to the moving direction of the probe at the first measurement section, as viewed in the first cross-sectional profile, and oblique to a direction in which the first and second cross-sectional profiles are adjacent to one another.

3. A cross-sectional profile measuring method of measuring cross-sectional profiles of an object at plural measurement sections of the object with a contact probe, the method comprising:

circularly moving the probe by passing through a first start point of a first measurement section along a route around a circumference of the object to return to the first start point, a distance of the moving being equal to a length of the circumference of the object plus a length of a predetermined overlapping range and measuring a first cross-sectional profile of the first measurement section;

circularly moving the probe by passing through a second start point of a second measurement section along a route around a circumference of the object to return to the second start point, a distance of the moving being equal to a length of the circumference of the object plus a length of the overlapping range and measuring a second cross-sectional profile of the second measurement section; and when the probe is shifted from the first measurement section to the second measurement section, moving the probe to the second measurement section in a movement direction oblique to the route around the circumference of the object along which the probe is moved to measure the first cross-sectional profile, to offset a distance corresponding to the overlapping range, wherein the circularly moving the probe by passing through the first start point of the first measurement section along the route around the circumference of the object to return to the first start point comprises circularly moving the probe by passing through successive ranges of a first acceleration range, a first measurement range, and a first deceleration range in this order, in the first measurement range the probe passing the first start point of the first measurement section along the route around the circumference of the object to return to the first start point, a distance of the first measurement range being equal to a length of the circumference of the object; and the circularly moving the probe by passing through the second start point of the second measurement section along the route around the circumference of the object to return to the second start point comprises circularly moving the probe by passing through successive ranges of a second acceleration range, a second measurement range, and a second deceleration range in this order, in the second measurement range the probe passing the second start point of the second measurement section along the route around the circumference of the object to return to the second start point, a distance of the second measurement range being equal to a length of the circumference of the object.

4. A cross-sectional profile measuring method of measuring cross-sectional profiles of an object at plural measurement sections of the object with a contact probe, the method comprising:

circularly moving the probe by passing through a first start point of a first measurement section along a route around a circumference of the object to return to the first start point, a distance of the moving being equal to a length of the circumference of the object plus a length of a predetermined overlapping range and measuring a first cross-sectional profile of the first measurement section;

circularly moving the probe by passing through a second start point of a second measurement section along a route around a circumference of the object to return to the second start point, a distance of the moving being equal to a length of the circumference of the object plus a length of the overlapping range and measuring a second cross-sectional profile of the second measurement section; and when the probe is shifted from the first measurement section to the second measurement section, moving the probe to the second measurement section in a movement direction oblique to the route around the circumference of the object along which the probe is moved to measure the first cross-sectional profile, to offset a distance corresponding to the overlapping range, wherein before circularly moving the probe by passing the probe through the first start point of the first measurement section along the route around the circumference of the object and returning the probe to the first start point, the method further comprises allocating the probe at a first acceleration point and accelerating the probe toward the first start point of the first measurement section;

after circularly moving the probe by passing the probe through the first start point of the first measurement section along a route around a circumference of the object and returning the probe to the first start point, and measuring the first cross-sectional profile of the first measurement section, the method further comprises decelerating the probe toward a first deceleration point and stopping the probe at the first deceleration point;

before circularly moving the probe by passing the probe through the second start point of the second measurement section along the route around the circumference of the object and returning the probe to the second start point, the method further comprises allocating the probe at a second acceleration point and accelerating the probe toward the second start point of the second measurement section; and after circularly moving the probe by passing the probe through the second start point of the second measurement section along the route around the circumference of the object and returning the probe to the second start point, and measuring the second cross-sectional profile of the second measurement section, the method further comprises decelerating the probe toward a second deceleration point and stopping the probe at the second deceleration point.

5. A cross-sectional profile measuring method of measuring cross-sectional profiles of an object at plural measurement sections of the object with a contact probe, the method comprising:

circularly moving the probe from a first measurement-start point of a first measurement section along a route around a circumference of the object to a first measurement-end point, correcting the first measurement-start point and the first measurement-end point so that a first cross-sectional profile of the first measurement section is provided in a closed loop, and measuring the first cross-sectional profile;

circularly moving the probe from a second measurement-start point of a second measurement section along a route around a circumference of the object to a second measurement-end point, correcting the second measurement-start point and the second measurement-end point so that a second cross-sectional profile of the second measurement section is provided in a closed loop, and measuring the second cross-sectional profile; and when the probe is shifted from the first measurement section to the second measurement section, moving the probe to the second measurement section in a movement direction oblique to the route around the circumference of the object along which the probe is moved to measure the first cross-sectional profile, wherein the circularly moving the probe at the first measurement section comprises circularly moving the probe by passing through successive ranges of a first acceleration range, a first measurement range, and a first deceleration range in this order; and the circularly moving the probe at the second measurement section comprises circularly moving the probe by passing through successive ranges of a second acceleration range, a second measurement range, and a second deceleration range in this order.

6. A cross-sectional profile measuring method of measuring cross-sectional profiles of an object at plural measurement sections of the object with a contact probe, the method comprising:

circularly moving the probe from a first measurement-start point of a first measurement section along a route around a circumference of the object to a first measurement-end point, correcting the first measurement-start point and the first measurement-end point so that a first cross-sectional profile of the first measurement section is provided in a closed loop, and measuring the first cross-sectional profile;

circularly moving the probe from a second measurement-start point of a second measurement section along a route around a circumference of the object to a second measurement-end point, correcting the second measurement-start point and the second measurement-end point so that a second cross-sectional profile of the second measurement section is provided in a closed loop, and measuring the second cross-sectional profile; and when the probe is shifted from the first measurement section to the second measurement section, moving the probe to the second measurement section in a movement direction oblique to the route around the circumference of the object along which the probe is moved to measure the first cross-sectional profile, wherein before circularly moving the probe from the first measurement-start point of the first measurement section along the route around the circumference of the object to the first measurement-end point, the method further comprises allocating the probe at a first acceleration point and accelerating the probe toward the first measurement-start point;

after circularly moving the probe from the first measurement-start point of the first measurement section along the route around the circumference of the object to the first measurement-end point, and measuring the first cross-sectional profile, the method further comprises decelerating the probe toward a first deceleration point and stopping the probe at the first deceleration point;

before circularly moving the probe from the second measurement-start point of the second measurement section along the route around the circumference of the object to the second measurement-end point, the method further comprises allocating the probe at a second acceleration point and accelerating the probe toward the second measurement-start point; and after circularly moving the probe from the second measurement-start point of the second measurement section along the route around the circumference of the object to the second measurement-end point, and measuring the second cross-sectional profile, the method further comprises decelerating the probe toward a second deceleration point and stopping the probe at the second deceleration point.

* * * * *